United States Patent
Menashe et al.

(10) Patent No.: US 9,557,946 B2
(45) Date of Patent: Jan. 31, 2017

(54) METHOD AND SYSTEM FOR GENERATING A PRINT JOB

(71) Applicant: Hewlett-Packard Indigo, B.V., Amstelveen (NL)

(72) Inventors: Avihay Menashe, Ness Ziona (IL); Itzik Kent, Ness Ziona (IL)

(73) Assignee: Hewlett-Packard Indigo B.V., Amstelveen (NL)

( * ) Notice: Subject to any disclaimer, the term of this patent is extended or adjusted under 35 U.S.C. 154(b) by 0 days.

(21) Appl. No.: 14/762,420

(22) PCT Filed: Jan. 29, 2013

(86) PCT No.: PCT/EP2013/000266
§ 371 (c)(1),
(2) Date: Jul. 21, 2015

(87) PCT Pub. No.: WO2014/117789
PCT Pub. Date: Aug. 7, 2014

(65) Prior Publication Data
US 2016/0147484 A1   May 26, 2016

(51) Int. Cl.
*G06F 15/00*   (2006.01)
*G06K 1/00*    (2006.01)
*G06K 15/00*   (2006.01)
*G06F 3/12*    (2006.01)

(52) U.S. Cl.
CPC .......... *G06F 3/125* (2013.01); *G06F 3/1208* (2013.01); *G06F 3/1264* (2013.01); *G06F 3/1285* (2013.01)

(58) Field of Classification Search
CPC ...... G06F 3/125; G06F 3/1208; G06F 3/1264; G06F 3/1285; G06K 15/02

USPC .................................................. 358/1.18, 1.1
See application file for complete search history.

(56) References Cited

U.S. PATENT DOCUMENTS

| | | |
|---|---|---|
| 6,930,791 B2 | 8/2005 | Jackelen |
| 7,282,687 B2 | 10/2007 | Matsuda et al. |
| 7,900,146 B2 | 3/2011 | Kozuka et al. |
| 8,027,044 B2 | 9/2011 | Sato et al. |

(Continued)

FOREIGN PATENT DOCUMENTS

JP   2006-309351   11/2006

OTHER PUBLICATIONS

International Search Report and Written Opinion dated Sep. 27, 2013, issued on PCT Patent Application No. PCT/EP2013/000266, dated Jan. 29, 2013, European Patent Office.

*Primary Examiner* — Douglas Tran

(57) ABSTRACT

A computer-implemented method of controlling the creation of a printed document includes the steps of: retrieving print information for generating a print job, said print information specifying characteristics of a document to be printed; retrieving at least one attribute of a print finishing device, said attribute defining a constraint imposed on the print job for printing said document, when the printed document is processed in said print finishing device; and generating a print job based on said print information and said constraint. In one example, retrieving said at least one attribute of a print finishing device includes establishing a communication link to said print finishing device and prompting the print finishing device to transmit the at least one attribute. Said communication link can be established and used on-line at the time of generating the print job or in advance.

13 Claims, 2 Drawing Sheets

(56) References Cited

U.S. PATENT DOCUMENTS

| | | | |
|---|---|---|---|
| 2002/0118382 A1* | 8/2002 | Jackelen | G06K 15/00 358/1.13 |
| 2006/0238793 A1 | 10/2006 | Akashi et al. | |
| 2008/0265482 A1* | 10/2008 | Morales | B65H 33/04 270/52.02 |
| 2010/0199287 A1 | 8/2010 | Boda et al. | |
| 2011/0188063 A1 | 8/2011 | Nuggehalli et al. | |

* cited by examiner

Paper size: A x B
Image area: a x b

METHOD AND SYSTEM FOR GENERATING A PRINT JOB

CLAIM FOR PRIORITY

The present application is a national stage filing under 35 U.S.C 371 of PCT application number PCT/EP 2013/000266, having an international filing date of Jan. 29, 2013, the disclosure of which is hereby incorporated by reference in its entirety.

BACKGROUND

Generally, printing systems are known which go from a simple desktop printer to a large format digital press which is able to produce any commercial print job and digitally print any size application, including pocket folders, multiple-page brochures, posters, and large lay-flat books, for example. Fully or half-automated digital printers, such as HP Indigo Digital Press, for example, enable highly-efficient imposition of jobs and support a large media range, including different sizes, weight and quality of printing papers, including coated, colored, metallic and other specialty papers and cardboard etc.

These and other printers often operate in combination with a print finishing device which may be integrated or separate from the printer as such. A print finishing device performs any type of post-processing of a printed document, such as cutting, stapling, folding, perforation, margin trim, creasing, coating, bookbinding and the like. Examples of print finishing devices are Duplo DC-645 and Lasermax Page Ready, without being limited thereto. Print finishing devices are fully or half-automated machines which can operate according to different selectable configurations and allow to perform different pre-programmed finishing jobs, such as stapling a predetermined number of pages, creasing, cutting and folding printed pages to a predetermined format, etc. Different print finishing jobs may require different impositions of the printed document.

It is known to provide an image with a finishing mark which can be extracted to determine the type of finishing which is required for the printed document. It is also known to incorporate commands into a print job for determining which finishing operations shall be performed on the print run. The printing device can select a finishing device that can perform all or a maximum of the demands.

SHORT DESCRIPTION OF DRAWINGS

Figure 3:
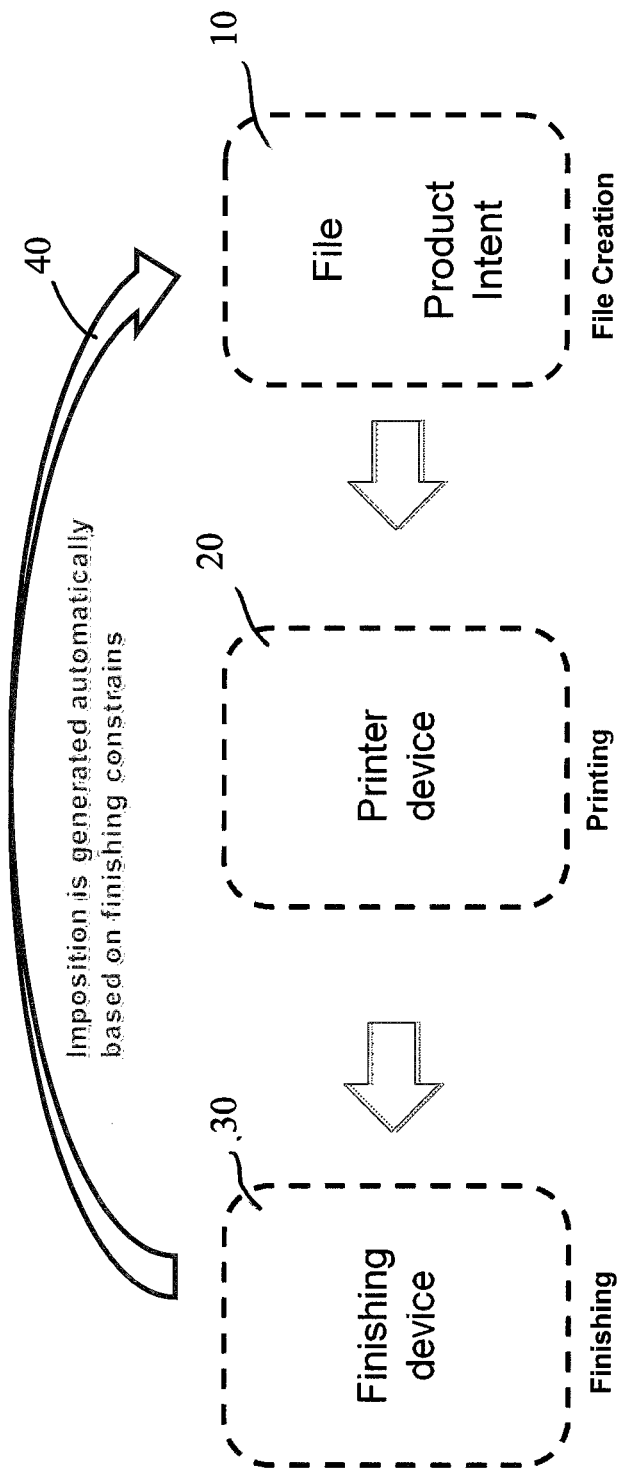

FIG. 3 schematically shows a block diagram of one example of a system for generating a print job.

DETAILED DESCRIPTION

Figure 1:
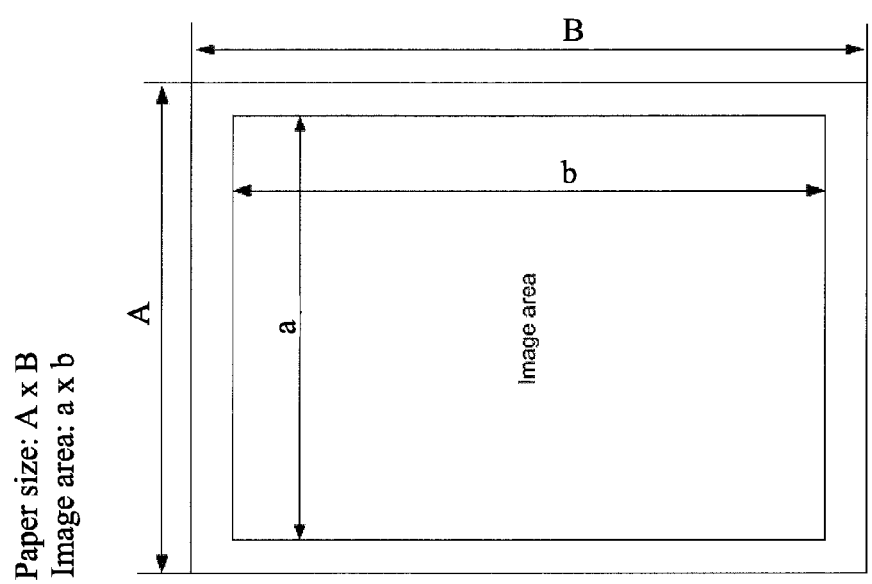
FIG. 1 shows one example of a document to be printed including a predefined image area.

When creating a print job for a document to be printed using any type of printer, the layout of the printout is limited only by the image area of the printing machine. For example, when printing on a print media, such as paper, having a predefined size A×B, such as 13"×19" or 29.7 cm×42 cm, the printer might ask for certain margins which are not to be printed on so that the image area a×b is smaller than the paper size A×B. For example, for a paper size of 13"×19", the image area could be 12.48"×18.26" or for a paper size of 29.7 cm×42 cm the image area could be 28.5 cm×41.2 cm, without being limited thereto. Within this image area a×b, it is possible to place any image or images that a user requires without further limitations; see FIG. 1.

Figure 2:
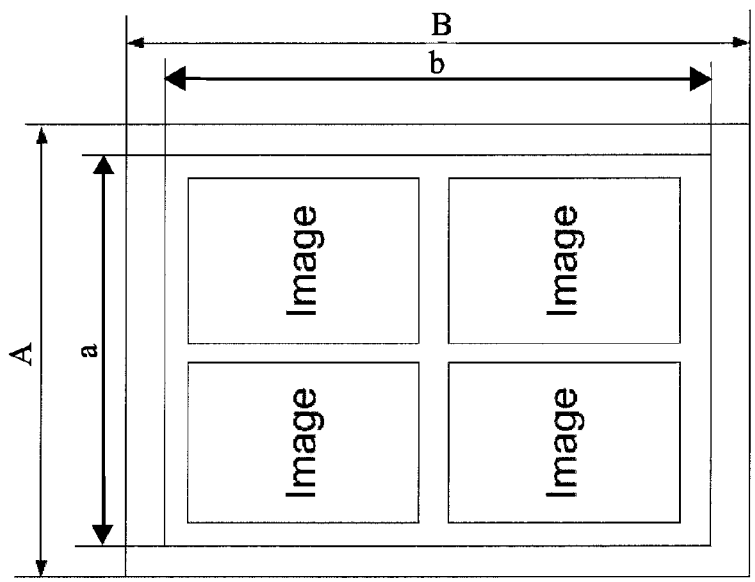
FIG. 2 shows the document of FIG. 1 with an imposition template overlay.

Accordingly, also when arranging the pages of a printed product on a print media, having regard to constraints of the printer, the imposition is limited only by the image area of the printer machine. FIG. 2 shows one example of an imposition where four images are arranged within the image area a×b on a sheet of print media having the size of A×B. Within the image area a×b, any other arrangement of images, including any number and size of images, image pitch, image spacing, etc., is allowed, as far as printer constraints are concerned.

Imposition is one of the steps in the generation of a print job. It consists in the arrangement of the pages of a printed product on a print media in order to obtain a more efficient use of the print media and simplified post-printing processing of the print media, for example. Correct imposition minimizes printing time by maximizing the number of pages per impression and hence reduces the costs of printing time and material. The arrangement of the pages on the print media is effected by different parameters, such as the format of the final printed product, the number of pages of the final printed product, the type of post-printing processing, such as cutting, creasing, folding, stapling, stitching, binding, etc., without being limited thereto.

On the market there are different print finishing devices which impose different limitations on the imposition of printed pages, depending also on variable configurations of the print finishing devices, such as minimum and/or maximum gutter size, minimum and/or maximum side trim, minimum and/or maximum image size (final format), amount of UPs on the print media, wherein a UP refers to multiple copies of the same image in one imposition on a single sheet of print media, allowable locations of crease lines, perforations, slits, etc., minimum and/or maximum size of input sheet and so forth.

When generating a print job, imposition usually is being done by a pre-press department which will need to know which print finishing devices are available to a production department and which print finishing device and which particular configuration of the print finishing device the production department intends to use. Based on the print finishing device to be selected and the device constraints, the pre-press department needs to create the correct imposition.

If the pre-press department does not know or does not properly take into account the constraints of the print finishing device, the job will be printed by the printer, taking into account only the printer's limitations, and the printed document will arrive at the print finishing device wherein only at that time the production department will realize that the printed document cannot be processed as required.

Examples of the method and system can be used in combination with any type of printers and print finishing devices and may be implemented, at least in part, as a computer software running on a workstation computer, a server, a distributed computing environment or a printer CPU, for example, without being limited thereto.

One example of a computer-implemented method of controlling the creation of a printed document includes the steps of: retrieving print information for generating a print job, said print information specifying characteristics of a document to be printed; retrieving at least one attribute of a print finishing device, said attribute defining a constraint imposed on the print job for printing said document, when the printed document is processed in said print finishing device; and generating a print job based on said print information and said constraint. In one example, retrieving said at least one attribute of a print finishing device includes establishing a communication link to said print finishing device and prompting the print finishing device to transmit the at least one attribute. Said communication link can be established and used on-line at the time of generating the print job or in advance whereby one or more attributes of the print finishing device are retrieved and stored. Retrieving at least one attribute of a print finishing device may comprise automatically retrieving said at least one attribute.

Accordingly, in this example, when generating a print job, it is not necessary that a pre-press department knows about constraints and limitations of a print finishing device but a user may simply select a desired print finishing device and/or configuration of a print finishing device wherein the method can automatically retrieve one or more attributes of said print finishing device for determining constraints imposed on the print job for printing the documents when said printed documents are to be processed in the print finishing device. The print job is then generated taking into account the print information and said constraints.

Selection and/or configuration data of the print finishing device may be included in the print information and retrieving said at least one attribute of the print finishing device can include sending said configuration data to the print finishing device and retrieving at least one constraint of the print finishing device corresponding to said configuration data.

Print information for generating the print job may be input by a user and retrieving print information may include retrieving said information input by the user. It is also possible that print information is generated automatically by a data processing system which is triggered by some type of event, such as a newsflash, weather forecast, incoming image stream, etc., without being limited thereto.

The at least one attribute may be stored in an attribute table wherein the attribute table may be stored in a memory located in or remote from the print finishing device. It also is possible to store the attributes or attribute table in the print finishing device and, additionally, at a location remote from the print finishing device. For example, once the attribute(s) has (have) been retrieved, all or a limited number of attributes can be buffered in a data processing system on which a computer program for performing the method is running.

In and/or remote from the print finishing device, a memory may be provided which stores a plurality of attributes for at least one configuration of at least one print finishing device. Each print finishing device may have more than one configuration for post-processing printed documents and each configuration may impose one or more constraints on the printed product. Accordingly, for each configuration and each print finishing device a set of attributes corresponding to print job constraints may be defined and stored.

In one example, the attributes define one or more imposition constraints. Imposition constraints may relate to at least one of a gutter size, a side trim, a total image size, a total size of an input sheet, a location of one or more slits, cuts, perforations, or creases, and an amount of UPs printed on one sheet of a printed media, without being limited thereto. Depending on these constraints, multiple images printed on one sheet of print media may be located only in a particular defined raster, will need to have certain minimum and/or maximum sizes, distances, pitches, etc., without being limited thereto.

In one example, the method is implemented in an imposition tool which is a computer program which, for example, is configured to run on at least one of a workstation computer, a server, a distributed computing environment, or a printer CPU. In one example, the software will run on a computer external to the printer and the print finishing device wherein an operator of the imposition tool will retrieve one or more attributes of the print finishing device through a communication link when generating the print job. The operator may, for example, define a desired print finishing device and/or configuration of a print finishing device and the imposition tool will establish a communication to the print finishing device and retrieve the necessary attributes defining print job constraints.

The method may be embodied in a computer readable medium having stored therein instructions for causing a central processing unit to execute the method.

In one example, a computer readable medium is used in an imposition tool for creating an imposition of a document to be printed, the computer readable medium having stored thereon an attribute table in which at least one attribute associated with at least one print finishing device is stored, each of said at least one attribute defining a constraint imposed on a printed document that is to be processed in said at least one print finishing device. In one example, said attribute defines an imposition constraint.

According to one example, the computer readable medium can be used for controlling a printing device by performing the steps of: receiving a data stream for a print job; analyzing said print job to determine whether it includes post-processing a printed document by one of said at least one print finishing device and whether a document printed according to said print job meets said at least one constraint of said print finishing device; and, if said print job includes post-processing a printed document by said print finishing device but does not meet said at least one constraint, modifying said print job to control the printing device according to the print job.

In another example, a system for generating a print job is provided, the system including a processing unit configured for retrieving print information for generating a print job, said print information specifying characteristics of a document to be printed; retrieving at least one attribute of a print finishing device, said attribute defining a constraint imposed on the print job for printing said document; and generating a print job based on said print information and said constraints. Said at least one attribute may be stored in an attribute table in a memory provided in the system. The system may further comprise a communication interface for communicating with said print finishing device and it may comprise the same or a further communication interface for communicating with a printing machine. The communication interface may be a wireless or wire-based electronic communication interface.

The system may further comprise a graphical user interface for inputting print information by a user. The attribute of the print finishing device may be retrieved automatically from the print finishing device based on the print information input by the user.

FIG. 3 shows a schematic block diagram of an example of a system for generating a print job. The system comprises an imposition tool 10, a printer device 20, and a print finishing device 30. The imposition tool 10 and the print finishing device 30 are connected by a wireless or wire-based communication link. The imposition tool 10 may be a computer software program which runs on a workstation, server, distributed computing environment or the like. The imposition tool may comprise a graphical user interface allowing an operator to input print information for specifying limitations of a document to be printed including the specification of a print finishing job and/or print finishing device and/or configuration of a print finishing device. Alternatively, the imposition tool 10 may receive print information from another source, such as a higher-ranking control system.

Based on the specification of the print finishing job and/or print finishing device and/or configuration of print finishing device, the imposition tool 10 can establish the communication link 40 to the print finishing device 30 and retrieve one or more associated attributes of the print finishing device defining one more constraints imposed on the print job. These attributes can be retrieved on-line when generating the print job or could be retrieved in advance and stored in the imposition tool or in any memory which can be accessed by the imposition tool.

The imposition tool 10 then generates a print job which takes into account limitations of the associated printer 20 and print finishing device 30 and sends the print job to the printer 20.

After printing, the printed documents are forwarded from the printer 20 to the print finishing device 30 for performing any desired post-printing processing jobs.

Examples of the method and system are not limited to determining a correct imposition where a plurality of printed images per impression is generated. Rather, the invention can also be applied to printing only a single image on a sheet of paper where the printed paper is post-processed in a print finishing device, such as by stacking, stapling, coating, etc., without being limited to any particular post-processing steps.

The invention claimed is:

1. A computer-implemented method of controlling creation of a printed document, including:
    retrieving print information for generating a print job, said print information specifying characteristics of a document to be printed;
    retrieving an attribute of a print finishing device, said attribute defining an imposition constraint that is related to at least one of: a gutter size, an image size, a location of a crease line, and a size of an input sheet imposed on the print job for printing said document, when the printed document is processed in said print finishing device; and
    generating a print job based on said print information and said imposition constraint.

2. The computer-implemented method of claim 1, wherein retrieving said attribute of a print finishing device includes establishing a communication link to said print finishing device and prompting the print finishing device to transmit the attribute.

3. The computer-implemented method of claim 2, wherein retrieving said attribute of a print finishing device includes sending configuration data to the print finishing device and retrieving an imposition constraint of the print finishing device corresponding to said configuration data.

4. The computer-implemented method of claim 1, wherein retrieving print information for generating a print job includes retrieving information input by an operator, and retrieving an attribute of a print finishing device comprises automatically retrieving said attribute.

5. The computer-implemented method of claim 1, wherein said attribute is stored in an attribute table.

6. The computer-implemented method of claim 1, wherein said attribute is retrieved from a memory storing a plurality of attributes for at least one configuration of at least one print finishing device.

7. The computer-implemented method of claim 1, wherein said print information includes at least one of a specification of a print finishing device and a configuration of a print finishing device for post-processing a printed document.

8. The computer-implemented method of claim 1 which is implemented in an imposition tool.

9. The computer-implemented method of claim 8, wherein the imposition tool is a computer program to run on at least one of: a workstation computer, a server, a distributed computing environment, and a printer CPU.

10. A non-transitory computer readable medium, having stored therein instructions for causing a central processing unit to control creation of a printed document, wherein the instructions are to cause the central processing unit to:
    retrieve print information for generating a print job, said print information specifying characteristics of a document to be printed;
    retrieve an attribute of a print finishing device, said attribute defining an imposition constraint that is related to at least one of: a gutter size, an image size, a location of a crease line, and a size of an input sheet imposed on the print job for printing said document, when the printed document is processed in said print finishing device; and
    generate a print job based on said print information and said imposition constraint.

11. A system for generating a print job, the system including
    a central processing unit to retrieve print information for generating a print job, said print information specifying characteristics of a document to be printed;
    a communication interface to retrieve an attribute of a print finishing device, said attribute defining an imposition constraint that is related to at least one of: a gutter size, an image size, a location of a crease line, and a size of a in input sheet imposed on the print job for printing said document, wherein the printed document is processed in the print finishing device; and
    wherein the central processing unit is to generate a print job based on said print information and said imposition constraint.

12. The system of claim 11, further comprising a memory, wherein said attribute is stored in an attribute table in said memory.

13. The system of claim 11, wherein said print information includes at least one of a specification of a print finishing device and a configuration of a print finishing device for post-processing a printed document.

* * * * *